Sept. 5, 1950 W. G. VAN VOORHIS 2,521,658
DIFFERENTIAL DRIVING AND STEERING MECHANISM
Filed Jan. 23, 1947 2 Sheets-Sheet 1

INVENTOR.
*William G. Van Voorhis.*
BY
*Corbett, Mahoney & Miller*
ATTORNEYS

Sept. 5, 1950     W. G. VAN VOORHIS     2,521,658
DIFFERENTIAL DRIVING AND STEERING MECHANISM
Filed Jan. 23, 1947     2 Sheets-Sheet 2
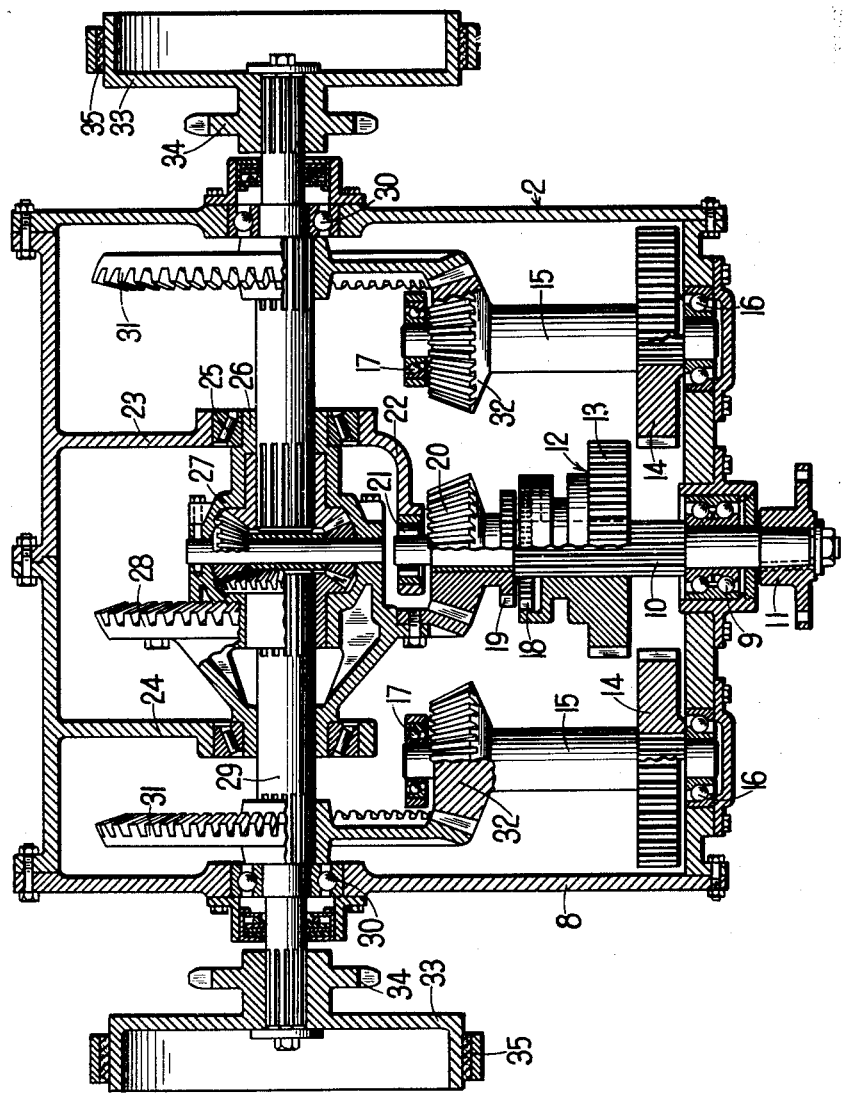
INVENTOR.
William G. VanVoorhis.
BY
Corbett, Mahoney & Miller
ATTORNEYS Patented Sept. 5, 1950

2,521,658

UNITED STATES PATENT OFFICE 2,521,658

DIFFERENTIAL DRIVING AND STEERING MECHANISM

William G. Van Voorhis, Columbus, Ohio, assignor to The Jaeger Machine Company, Columbus, Ohio, a corporation of Ohio Application January 23, 1947, Serial No. 723,710

8 Claims. (Cl. 74—664)

My invention relates to differential driving and steering mechanism. It has to do, more particularly, with differential driving and steering mechanism for power-driven vehicles.

There are many types of self-propelled vehicles in use at the present time wherein steering is accomplished without the use of steering wheels and associated steering gear, but by the use of differential driving mechanism or independent clutches for driving the traction means at opposite sides of the machine at different relative speeds. These vehicles include the following types and others: full crawlers at each side of the machine; driving wheels, either single drive or tandem, on both sides; half crawlers for driving purposes on both sides and at one end of the machine and one or more caster or steering wheels at the other end; and driving wheels, either single drive or tandem, on both sides and at one end of the machine, and one or more caster or steering wheels at the other end. For example, such machines may be designed as full crawler tractors, ditching machines, crawler mounted compressors, crawler mounted shovels, rubber-tired shovels, military tanks, amphibious army vehicles, heavy cargo transport vehicles, lumber hauling machines, road-paving machines, etc.

One of the objects of my invention is to provide driving mechanism for the traction members of a power-driven vehicle of the type wherein the steering is accomplished by driving such traction members on opposite sides of the vehicle at differential speeds thereby eliminating the necessity of providing a steering wheel and associated steering gear, such driving mechanism being so designed that the finest deviation from the line of travel of the vehicle to the right or to the left can be made at the will of the operator.

Another object of my invention is to provide differential driving mechanism for the traction members of a vehicle of the type indicated above which is such that complete about-face turns can be made readily during a very short interval and in a minimum amount of space.

Another object of my invention is to provide a differential driving mechanism for the traction members of a vehicle of the type indicated which is such that power may be applied equally to the traction members on opposite sides of the vehicle to drive them in the same direction at the same speed; power may be applied to such traction members to drive them in the same direction at different relative speeds; or power may be applied to such traction members to drive the ones at opposite sides in opposite directions.

Another object of my invention is to provide driving mechanism of the type indicated above whereby full power can be applied to the traction members on opposite sides of the vehicle not only to drive them equally in the same direction to propel the machine but also to drive them in opposite directions for turning the vehicle completely around under unfavorable conditions and under close space limitations.

A further object of my invention is to provide driving mechanism of the type indicated including means whereby effective traction braking force can be applied readily for stopping the vehicle.

Various other objects will be apparent.

In its preferred form, I provide a differential driving and steering unit which has an input shaft that is driven from a suitable power unit. The connection from the power unit to my unit preferably includes a master clutch and a suitable forward and reverse or multiple speed forward and reverse transmission. My unit is provided with a pair of output shafts which will drive the traction members on opposite sides of the vehicle. The two output shafts have a differential of the usual type associated therewith. Also, each of the shafts has a direct drive associated therewith which by-passes the differential, such direct drives serving to drive the output shafts in opposite directions. I provide a clutch arrangement in my unit which may be selectively actuated whereby the drive to the output shafts will be either through the differential or through the direct drives. Such clutch arrangement can either be positive as described hereinafter or it can be of the friction type if the latter is preferred. If the output shafts are connected to traction members on opposite sides of the vehicle, such members will be driven in the same direction when the differential drive is used and in opposite directions when the direct drives are used. I provide a brake associated with each of the output shafts, whereby a braking force can be applied to either of the shafts to permit differential speeds of the traction members at opposite sides of the vehicle when the differential drive is used, or can be applied to both of such shafts to exert a braking action on the traction members on both sides of the vehicle, whether the differential or the direct drives are in use.

The foregoing and other objects and advantages of the present invention will appear from the following description and appended claims when considered in connection with the accompanying drawings forming a part of the specification wherein like reference characters designate corresponding parts in the several views and wherein:

Figure 3 is a horizontal sectional view taken through a driving unit, constructed according to my invention, along line 3—3 of Figure 1.

Before explaining in detail the present invention, it is to be understood that the invention is not limited in its application to the details of construction and arrangement of parts illustrated in the accompanying drawings since the invention is capable of other embodiments and of being practiced or carried out in various ways. It is to be understood also that the phraseology or terminology employed herein is for the purpose of description and not of limitation.

Figure 1:
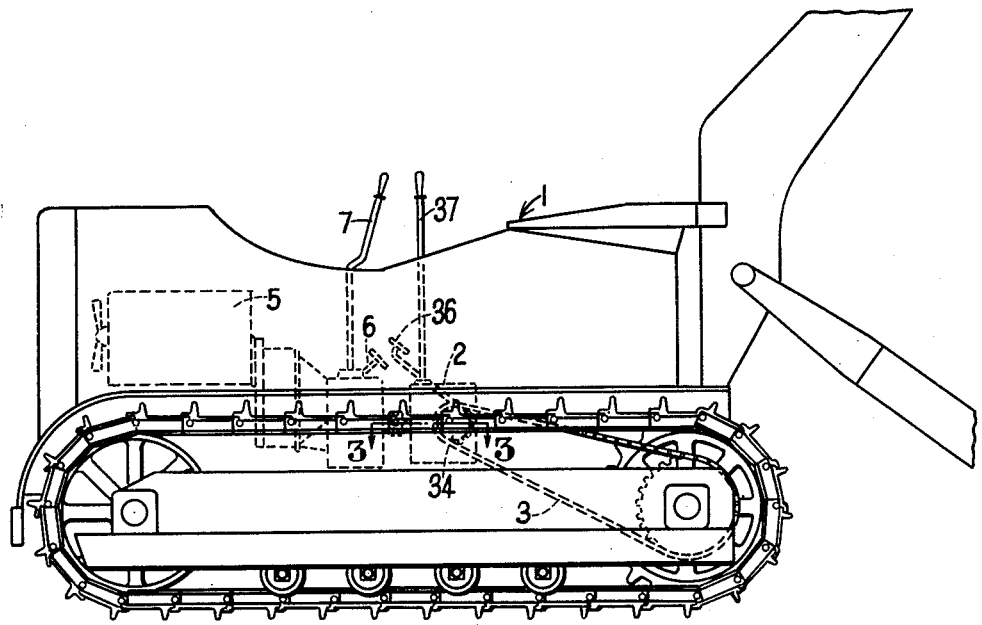
Figure 1 is a side elevational view of a vehicle to which my invention is applied.
Figure 2:
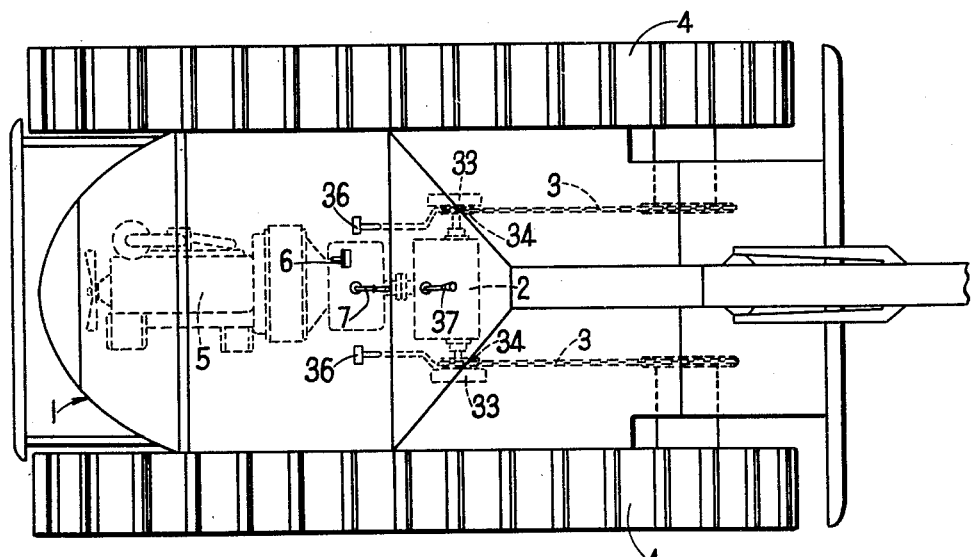
Figure 2 is a plan view of the vehicle.

In Figures 1 and 2, I illustrate a tractor 1 as an example of a vehicle to which my driving unit 2 may be applied. The unit 2 will serve to drive, through the chain and sprocket drives 3 or other suitable drives, the traction members 4 and 4a on opposite sides of the vehicle 1. These traction members 4 and 4a are shown as being in the form of crawler units but, as previously indicated, may be of various other types. My unit 2 is driven from the power unit 5 of the vehicle 1 by a suitable driving connection which may include a master clutch actuated by a pedal 6 and a forward and reverse or multiple forward and reverse transmission actuated by a lever 7.

My driving unit 2 is illustrated in detail in Figure 3. It comprises a housing 8 made of suitable cast or fabricated sections bolted together. In the forward wall of the housing a ball bearing 9 is mounted and rotatably carries the input shaft 10 which projects forwardly from the housing. The projecting end of the shaft 10 has a flanged driving coupling 11 keyed thereon and which is used in coupling the shaft 10 to the driven shaft of the main transmission. A pinion unit 12 is splined on the shaft 10, within housing 8, for axial movement and the pinion portion 13 thereof is adapted to be brought into and out of engaging relationship with a pair of pinions 14 disposed on diametrically opposed sides of the shaft 10. The pinions 14 are keyed on the forward ends of shafts 15 which are disposed in spaced parallel relationship to shaft 10 and whose forward ends are mounted in ball bearings 16, in the forward wall of the housing 8, and whose rear ends are mounted in a ball bearing 17 suitably supported by the housing.

The slidable pinion unit 12 is provided with a female dental clutch member 18, formed on the rear side thereof, which is adapted to receive the male dental clutch member 19 on the forward end of a bevel pinion 20. This pinion 20 is rotatably mounted on shaft 10 but is not slidable axially thereon. In the neutral position of unit 12, as shown in Figure 3, the pinion 13 is disengaged from the pinions 14 and the clutch member 18 is disengaged from member 19. If unit 12 is moved forwardly on shaft 10, the pinions 14 will be engaged and driven by pinion 13. On the other hand, if unit 12 is moved rearwardly, clutch member 18 will engage member 19 and pinion 20 will be driven with shaft 10.

The shaft 10 extends rearwardly through pinion 20 and its rear end is rotatably mounted in a roller bearing 21 carried by a bracket 22 which is formed as an integral part of the forwardly extending wall 23 which is integral with the back wall of the housing. A similar wall 24 is provided in spaced relationship to wall 23 and both of these walls are provided with axially aligned outlets for receiving the roller bearings 25. These roller bearings receive the sleeve-like ends 26 of the rotatable case of a differential unit 27. This unit 27 will not be described in detail as it is the usual type of automotive differential. It is provided with a large exterior ring gear 28 which is bolted to the housing and which is engaged by the pinion 20.

Extending from opposite ends of the differential unit 27 are the two output shafts 29. The unit 27 serves to drive these shafts in the usual way. These shafts extend outwardly through bearing unit 30 which are associated with the side walls of housing 8.

Keyed on each of the shafts 29 between the wall 23 or 24 and the outer side wall of the housing 8 is a bevel gear 31. Each of the gears 31 is engaged by the associated bevel pinion 32 which is carried on the rear end of the shaft 15. The extreme outer end of each of the shafts 29 has a brake drum 33 keyed thereon. This brake drum has a sprocket 34 formed integral therewith at the inner side thereof. The sprockets 34 form part of the chain and sprocket drives 3 to the crawlers 4 and 4a. Associated with each of the drums 33 is a contractible brake band 35. A suitable control including a pedal 36 (Figures 1 and 2) may be provided for actuating each of the brake units independently of the other. A lever 37 may be provided for moving the pinion unit 12 and may be suitably connected thereto.

In the operation of the unit 2, when it is desired to propel the vehicle under conditions where only slight deviations to the right or to the left of the line of travel are required, the master clutch is disengaged by the pedal 6 and the pinion unit 12 is moved by means of handle 37 to cause clutch members 18 and 19 to be engaged. Then the master clutch is again engaged to drive shaft 10. The drive to output shafts 29 from input shaft 10 will then be through pinion 20, gear 28, and the differential 27. The differential equally divides the torque of the gear 28 and delivers half of this torque to each of the shafts 29 in the conventional manner. Under these conditions the bevel gears 31 drive the bevel pinions 32 on shafts 15 and the pinions 14 carried by such shafts. Thus, members 31, 32, 15, and 14 are merely idle and perform no function under these conditions. By this arrangement, the shafts 29 drive the crawlers 4 and 4a through the medium of the sprockets 34. If it is desired to make a slight deviation in the line of travel, one of the brakes is applied by operating a pedal 36 to contract the band 35 around the drum 33 and the crawler 4 at that side of the vehicle will move slower. At the same time, the crawler 4a will move faster. This will cause the vehicle to turn toward the side where the slower moving crawler 4 is located. Greater pressure on the brake which is being actuated causes a sharper turn, the degree of turn increasing as the brake pressure increases up to the maximum limit, which is controlled by the ability of the crawler 4 at one side of the machine to turn the vehicle against the resistance of the crawler which is being braked, plus the resistance of both crawlers to rotation in a horizontal plane.

Should it be desired to make a direct turn within a radius of the vehicle's own length, the master clutch is disengaged by pedal 6 and the slidable pinion unit 12 is then shifted to cause clutch members 18 and 19 to be disengaged and pinion 13 to engage pinions 14, after which the master clutch is again engaged. Power now is applied from input shaft 10, through pinion 13, pinions 14, shafts 15, pinions 32 and gears 31 to the output shafts 29. Thus, sprockets 34 will be rotated to drive crawlers 4 and 4a. However, the crawlers will be driven in opposite directions because the shafts 15 will be rotated in the same directions but since the bevel gears 31 are mounted one to the left and one to the right, respectively, of the pinions 32 with which they mesh, the output shafts 29 will be driven in opposite directions. This will produce the sharpest possible turn for this type of vehicle.

It will be apparent from the above that I have provided a driving unit which is particularly useful on a vehicle having no steering wheel or associated steering gear, for driving the propelling means on opposite sides of the vehicle in opposite directions for extremely short turns, together with means for differentially driving such propelling means in the same direction for making slight turns. With my unit, power is received at a single point and is converted into power delivered at two output points, the relative speed of rotation of the two output points being controllable from a condition of equal rotating speed in the same direction to a condition where one is stationary and the other travels at twice the equalized speed as well as providing all the intermediate ratios between these two extremes; or the two output points may travel at the same speed but in opposite directions. Another advantage of my unit is the flexibility of gear reduction ratios which can be incorporated therein. For example, a conventional 6 to 1 ratio could be incorporated in the unit for driving through the differential while a 10 to 1 or even 20 to 1 ratio could be embodied in the direct opposed drives. This is very important since a great deal more driving power is required on the traction members when making a sudden about-face turn, particularly when such members are partly mired down.

Various other advantages will be apparent.

Having thus described my invention, what I claim is:

1. A driving unit comprising an input shaft, a pair of output shafts, a differential drive associated with said output shafts for driving both of said shafts in the same direction, a driving connection between said input shaft and said differential drive adapted to be selectively actuated to drive the differential drive, a positive driving connection between each of said output shafts and said input shaft, said positive driving connections serving to drive one of the output shafts in one direction and the other in an opposite direction, and a connecting mechanism for selecting either the said driving connection of the differential drive or the direct drives for said output shafts, said connecting mechanism being the sole connection between said driving connection of the differential drive and said input shaft and between said positive drives and said input shaft and including a single shiftable member which in one position directly drives the said driving connection of the differential drive, in another position directly drives both of said positive drives and in an intermediate neutral position interrupts the said driving connection of the differential drive and the positive drives.

2. A unit according to claim 1 including a brake associated with each of said output shafts.

3. A driving unit comprising an input shaft and a pair of output shafts disposed in angular relationship, a differential unit connected between adjacent ends of said output shafts, a pinion carried freely on said input shaft and driving said differential unit, a slidable pinion unit on said input shaft carrying a clutch portion adapted to engage with a clutch portion on said first pinion and also carrying a pinion portion, a positive drive for each of said output shafts, said positive drives including a pair of pinions associated with said input shaft, said slidable pinion unit being movable to a position where the pinion portion thereof engages both of said last-named pinions or to a position where the clutch portion thereof engages the clutch portion of said first pinion, one of said positive drives including gearing which drives its output shaft in one direction and the other of said positive drives including gearing which drives its output shaft in an opposite direction.

4. A driving unit according to claim 3 wherein each of said output shafts has a friction type brake associated therewith which can be operated independently.

5. A driving unit comprising an input shaft and a pair of output shafts, said output shafts having their inner ends adjacent each other and having a differential unit associated therewith, said differential unit including a driving gear, said input shaft being disposed substantially at right angles to said output shafts, a pinion carried rotatably on said input shaft and engaging the driving gear of said differential unit, a driving gear keyed to each of said output shafts, driving units including gearing for driving the two driving gears carried by the output shafts in opposite directions, driving pinions for driving said driving units, said driving pinions being disposed with their axes parallel to said input shaft, and a slidable pinion unit on said input shaft having a clutch portion for engaging a mating clutch portion on said first-named pinion and a pinion portion for engaging both of said driving pinions, said slidable pinion unit being shiftable to a position where the said two clutch portions are engaged or to a position where the pinion portion thereof engages the two driving pinions.

6. A driving unit comprising an input shaft and a pair of output shafts, said output shafts having their inner ends adjacent each other and having a differential unit associated therewith, said differential unit including a driving gear, said input shaft being disposed substantially at right angles to said output shafts, a pinion carried rotatably on said input shaft and engaging the driving gear of said differential unit, a driving bevel gear keyed to each of said output shafts on opposite sides of said differential unit and facing each other, a pair of driving shafts disposed parallel to said input shaft in spaced relationship thereto on opposite sides thereof and each having a bevel pinion on one end engaging the face of one of said bevel gears, a driving pinion on the opposite end of each of said driving shafts, and a slidable pinion unit on said input shaft having a clutch portion for engaging a mating clutch portion on said first-named pinion and a pinion portion for engaging both of said driving pinions, said slidable pinion unit being shiftable to a position where the said two clutch portions are engaged or to a position where the pinion portion thereof engages the two driving pinions.

7. A driving unit according to claim 6 including an independently operable friction brake associated with each of said output shafts.

8. A driving unit according to claim 6 for driving the traction members on opposite sides of a vehicle, including a driving connection between each of said output shafts and the associated traction members of the vehicle.

WILLIAM G. VAN VOORHIS.

REFERENCES CITED

The following references are of record in the file of this patent:

UNITED STATES PATENTS

| Number | Name | Date |
|---|---|---|
| 1,205,184 | Frederickson | Nov. 21, 1916 |
| 1,290,266 | McEwen | Jan. 7, 1919 |
| 1,354,108 | Johnson | Sept. 28, 1920 |
| 1,428,584 | Folse et al. | Sept. 12, 1922 |
| 1,797,797 | Saives | Mar. 24, 1931 |
| 2,088,110 | Lamb | July 27, 1937 |
| 2,152,409 | Holtz | Mar. 28, 1939 |
| 2,295,492 | Stegmeier | Sept. 8, 1942 |
| 2,394,119 | Tomik | Feb. 5, 1946 |

FOREIGN PATENTS

| Number | Country | Date |
|---|---|---|
| 145,650 | Great Britain | June 30, 1920 |